Figure 1:
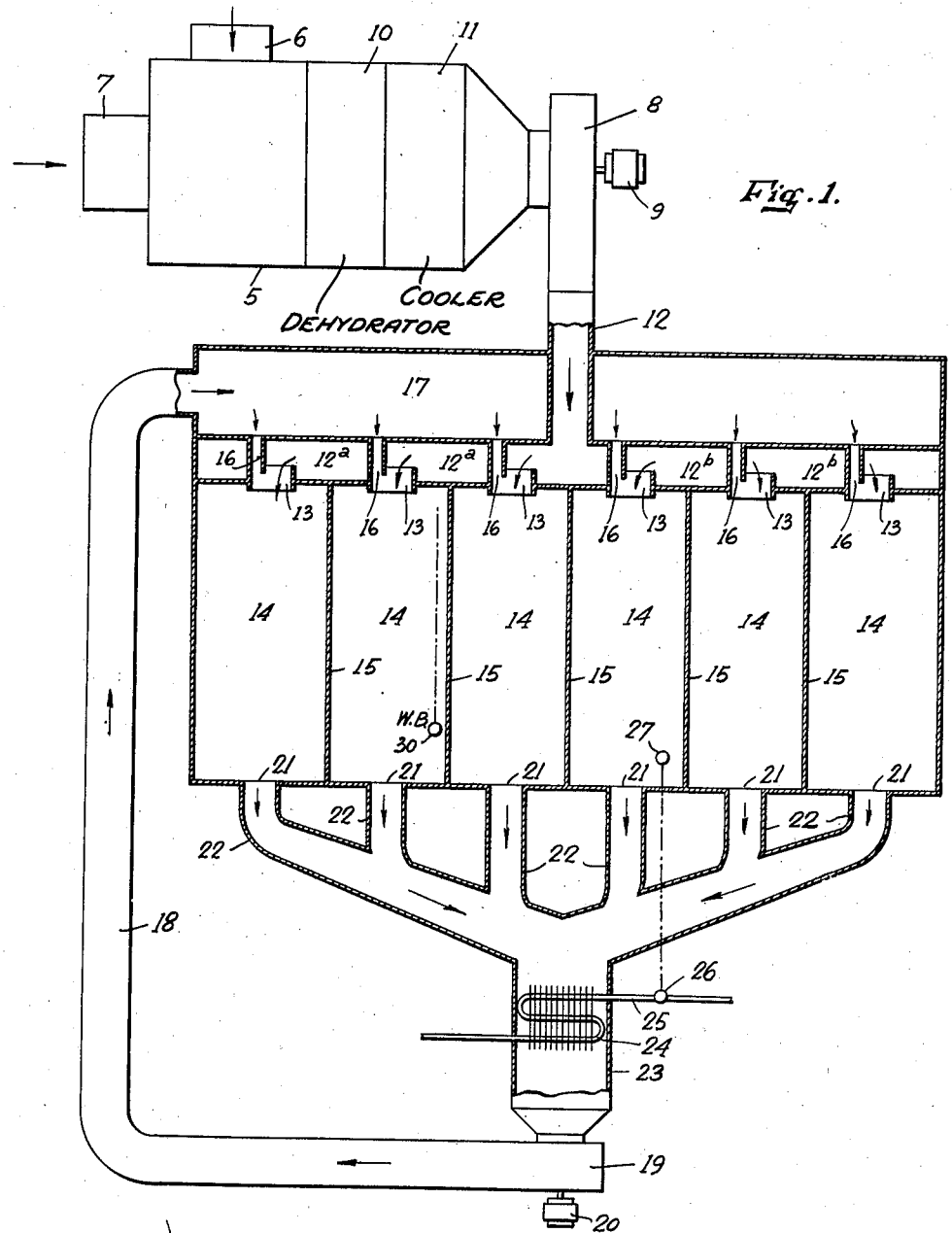

May 14, 1940.  C. M. ASHLEY  2,200,945

AIR CONDITIONING METHOD AND APPARATUS

Filed April 6, 1938

INVENTOR.
CARLYLE M. ASHLEY
BY Herman Sud
ATTORNEYS.

Patented May 14, 1940

2,200,945

UNITED STATES PATENT OFFICE 2,200,945

AIR CONDITIONING METHOD AND APPARATUS

Carlyle M. Ashley, Syracuse, N. Y., assignor to Carrier Corporation, Syracuse, N. Y., a corporation of Delaware Application April 6, 1938, Serial No. 200,496

6 Claims. (Cl. 236—44)

This invention relates to air conditioning.

The general object of the invention is to provide an improved method of and apparatus for air conditioning one or more enclosures or areas.

Another object of the invention is to provide an air conditioning system in which a first volume of air is conditioned by subjecting the air to the action of dehydrating agent, such as lithium chloride or silica gel, and in which the air thus conditioned is supplied to an enclosure together with other air, the supply of both of said airs providing desired atmospheric conditions in the enclosure, said other air consisting of air withdrawn from the enclosure and cooled by the abstraction of sensible heat therefrom.

Another object of the invention is to provide an air conditioning system of the central station type in which a central conditioning plant is used to condition a relatively small volume of air which is then distributed to a plurality of distribution points at a relatively great distance from said central station, the volume of said conditioned air being augmented at said points of utilization by other air withdrawn from the conditioned area and cooled by the abstraction of sensible heat only therefrom.

Another object of the invention is to provide an improved air conditioning system which is particularly well adapted for conditioning buildings having corridors and a plurality of separate rooms, such as hotels, for example. According to the invention such corridors or corresponding areas are conditioned to provide comfortable conditions therein and are utilized as a part of the air conditioning system.

A feature of the invention resides in dehydrating air to reduce its dewpoint temperature, controlling its dry bulb temperature during and/or subsequent to the dehydration process, supplying the air thus conditioned to one or more points of utilization, discharging the conditioned air at such point or points of utilization into the area to be conditioned augmented by other air, such other air consisting of air withdrawn from the conditioned area and cooled by the abstraction of sensible heat only.

Another feature of the invention resides in conditioning an enclosure by supplying thereto air having a relatively low dewpoint and a relatively high dry bulb temperature and other air having a higher dewpoint and a lower dry bulb temperature than the first-mentioned air.

Another feature of the invention resides in conditioning an enclosure by supplying thereto air having a relatively low dewpoint and a relatively high dry bulb temperature and other air having a higher dewpoint and a lower dry bulb temperature than the first-mentioned air, the other air consisting of air withdrawn from the enclosure and subjected to heat exchange adapted to remove sensible heat only from such air.

Figure 2:
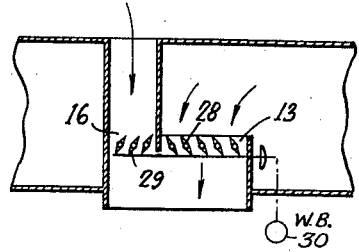

Other objects and features of the invention will be more apparent from the following description, to be read in connection with the accompanying drawing, in which Fig. 1 diagrammatically represents an air conditioning system in accordance with the invention, and Fig. 2 is an enlarged view of a section of Fig. 1.

Referring now to the drawing, similar designations referring to similar parts, numeral 5 designates generally an air conditioner adapted to receive air from one or more sources through inlet duct 6 and/or inlet duct 7, under the influence of fan 8, driven by motor 9. The air intaken within the conditioner 5 may comprise outdoor air only or outdoor air and air drawn from any other desired source as, for example, another enclosure in which an active circulation of air is maintained by the withdrawal of air therefrom. The conditioner 5 includes a dehydrator 10 which may be of the absorber type, utilizing a liquid absorber such as lithium chloride or calcium chloride, or of the solid adsorber type utilizing silica gel or the like. Since various forms of such dehydration apparatus are well-known and understood, no further description of this feature is deemed required. The conditioner 5 is also provided with a cooling means 11 adapted to cool the air dehydrated by the dehydrating apparatus 10. The cooling means 11 preferably comprises one or more heat exchange coils, preferably provided with extended surface, such as spiral fin, which is supplied with suitable cooling medium from any desired source, such as water from a deep well or city main. Although refrigeration may be used to provide cooling medium circulated through cooling means 11, the invention completely eliminates the necessity for providing artificial refrigeration, which heretofore has commonly been regarded as a necessity in most installations.

After the air has been dehydrated and cooled, it is distributed by main duct 12 and duct branches 12a and 12b to a plurality of outlets 13 each serving an enclosure 14. While the enclosures 14 are shown as separated from each other by partitions 15, it is to be understood that these partitions may be eliminated, if desired, so that the different openings 13 will serve different portions of a single area to be conditioned. Also supplied to the enclosure 14 through openings 16 is other air supplied from a chamber or area designated 17. Chamber or area 17 may be, for example, the corridor of a building in which the enclosures 14 are located, or it may constitute a duct of the usual type or one formed in a false ceiling of the corridor. Air is supplied to the chamber or area 17 through a duct 18 under the influence of fan 19, driven by motor 20, which draws such air through outlet openings 21 and ducts 22 leading from the various enclosures 14. The air thus withdrawn is passed through a conditioner 23 in which there is positioned a cooling means, such as cooling coil 24. Cooling coil 24 receives cooling medium through supply line 25 provided with a suitable valve 26. The cooling medium for coil 24 may be cold water drawn from a well, city main or the like. As explained above, artificial refrigeration may be used, if desired, but this is not necessary to attain the desired results.

In operation, the air which has been subjected to the dehydrating action of dehydrator 10 has a relatively low dewpoint or moisture content, due to the removal of moisture therefrom by the dehydrating agent, but the dry bulb temperature of such air is relatively high due to the release of the latent heat of vaporization of the moisture abstracted from the air. When the air is subjected to the action of cooling means 11, the dry bulb temperature of the air is decreased by the abstraction of sensible heat from the air, but the dewpoint of the air remains unchanged. In practice, it is contemplated that the dewpoint of the air leaving the conditioner 5 shall be of the order of 30° and that the dry bulb temperature of the air leaving the conditioner shall be of the order of 85° to 95°. Thus, while this air has a sufficiently low dewpoint to provide for the maintenance of relatively low humidities in the conditioned enclosure, the dry bulb temperature of the air is too high to provide desired low dry bulb temperatures in the conditioned enclosures. This, however, is offset by supplying to the conditioned enclosures 14, in addition to the air conditioned in conditioner 5, air from the chamber 17 which has a relatively low dry bulb temperature. This is assured by the operation of cooling coil 24, the valve 26 preferably being controlled by one or more room thermostats 27 responding to dry bulb temperatures in the conditioned enclosures. As will be understood, there is an increase in the moisture content of the air circulated through the enclosures 14 when the enclosures are occupied. Hence, the dewpoint of the air discharged from the enclosures will be higher than that of the entering air. The dewpoint of the air passing through outlets 21 may be, for example, of the order of 55°, and the dry bulb temperature of such air may be of the order of 75°. When this air passes through the conditioner 23, its dewpoint remains unchanged, since the cooling coil is effective for sensible heat reduction only and is not effective for dehumidifying, but the dry bulb temperature of such air is reduced to the order of 60°. Therefore, the air delivered from conditioner 23 to the chamber or area 17 has a higher dewpoint temperature but a lower dry bulb temperature than the air supplied from conditioner 5 through duct 12. The concurrent supply of both of these airs to the conditioned enclosures insures the maintenance of desired conditions of both dewpoint temperature (or moisture content) and dry bulb temperature therein.

The dehydrating apparatus 10 is preferably regulated in a manner well-known in the art to provide a constant dewpoint in the air leaving the conditioner 5. Thus, for example, if the dehydrating apparatus employs a liquid dehydrating agent such as lithium chloride, which is regenerated in a suitable regenerator, the supply of fluid to the regenerator may be controlled in accordance with the density of the liquid which contacts with air in the dehydrator 10 so that the regenerating action will be controlled to provide a constant density of the liquid which contacts the air.

As noted above, the dry bulb temperature within the enclosures 14 may be controlled by one or more thermostats 27 responsive to dry bulb temperatures therein and controlling the operation of cooling coil 24. It will be understood that these thermostats may, if desired, be positioned in the ducts 22 or at the inlet to the conditioner 23. Further, to control the humidity in the conditioned enclosures, the outlets 13 and 16 may be respectively provided with dampers 28 and 29, which are preferably differentially connected. Thus, as the dampers 29 close, the dampers 28 open, and vice-versa. The adjustment of the dampers may be controlled by a hygrostat or wet bulb thermostat 30 positioned within the enclosure. The hygrostat 30 operates to open dampers 28 when the humidity in the enclosure served thereby becomes too high and to correspondingly close the dampers 29. When the humidity falls below a predetermined point, reverse action will occur, the control 30 then serving to close the dampers 28 somewhat and to correspondingly open wider the dampers 29.

Since many modifications may be made in the invention without departing from its scope, it is intended that all matter contained in the above description or shown in the accompanying drawing shall be interpreted as illustrative only and not in a limiting sense, applicant limiting himself only as indicated in the appended claims.

I claim:

1. The method of conditioning a plurality of enclosures which consists in subjecting a first volume of air to the action of a dehydrating agent and supplying said dehydrated air to certain of said enclosures, withdrawing from said enclosures to which dehydrated air is supplied air which has circulated therein, cooling said withdrawn air to reduce the dry bulb temperature thereof by abstracting sensible heat only therefrom, supplying said withdrawn cooled air to another of said enclosures to be conditioned, and supplying air from said last-mentioned enclosure to said enclosures supplied with dehydrated air.

2. In an apparatus of the character described, a plurality of first enclosures to be conditioned, means for dehydrating a first volume of air, means for supplying said dehydrated air to said first enclosures, means for withdrawing from said enclosures air which has circulated therein, means for reducing the dry bulb temperature of said withdrawn air by abstraction of sensible heat only therefrom, means for supplying said cooled withdrawn air to a second enclosure to be conditioned, and means for supplying air from said second enclosure to said first enclosures, the supply to said first enclosures of both said dehydrated air and said cold withdrawn air serving to provide for the maintenance of desired atmospheric conditions within said first enclosures.

3. In an apparatus of the character described, a plurality of first enclosures to be conditioned, means for dehydrating a first volume of air, means for supplying said dehydrated air to said first enclosures, means for withdrawing from said enclosures air which has circulated therein, means for cooling said withdrawn air by abstraction of sensible heat only therefrom, means for supplying said cooled withdrawn air to a second enclosure to be conditioned and for circulating said air therethrough, means for supplying air from said second enclosure to said first enclosures, means for controlling the cooling of said withdrawn air in accordance with changes in one psychrometric characteristic of air in at least one of said first mentioned enclosures, and means for controlling the proportions of withdrawn air and dehydrated air supplied to each of said first enclosures in accordance with changes in another psychrometric characteristic of the air therein.

4. In an apparatus of the character described, a plurality of first enclosures to be conditioned, means for dehydrating a first volume of air, means for supplying said first volume of air to said first enclosures, means for withdrawing from said enclosures air which has circulated therein, means for cooling said withdrawn air by the abstraction of sensible heat only therefrom, means for supplying said cooled withdrawn air to a second enclosure to be conditioned, means for supplying air from said second enclosure to at least one of said first enclosures, means for controlling the cooling of said withdrawn air in accordance with changes in one psychrometric characteristic of air in at least one of said first mentioned enclosures, and means for controlling the proportions of withdrawn air and dehydrated air supplied to said first mentioned enclosures in accordance with changes in another psychrometric characteristic of the air therein, said means for supplying dehydrated and cooled air to said first mentioned enclosures and said proportion-controlling means being arranged to deliver dehydrated and cooled air to said first mentioned enclosures at a substantially constant rate notwithstanding variations in the proportions thereof.

5. The method of controlling the temperature and humidity of the atmosphere within an enclosure which consists in delivering to said enclosure, at a substantially constant rate, an air supply comprising two component portions, conditioning a first volume of air to a dry bulb temperature which is higher than the dry bulb temperature of the atmosphere to be maintained in said enclosure, and to a dewpoint which is lower than the dewpoint to be maintained in said enclosure, said conditioning step including at least the step of subjecting the first volume of air to the action of a dehydrating agent, supplying said first volume of air to said enclosure as one of the component portions of said air supply, withdrawing from said enclosure air which has circulated therein, cooling said withdrawn air by the abstraction of sensible heat only therefrom, controlling the cooling of said withdrawn air in accordance with changes in a psychrometric characteristic of the atmosphere in said enclosure, supplying said withdrawn cooled air to said enclosure as a second component of said air supply, and regulating the proportions of said first volume of air and said withdrawn air supplied to said enclosure in accordance with changes in another psychrometric characteristic of the atmosphere of said enclosure, whereby the relative proportions of dehydrated air and cooled air supplied to said enclosure may be varied while the total volume of air supplied to said enclosure remains constant.

6. The method according to claim 5, in which the sensible cooling of the withdrawn air is controlled in response to changes in the dry bulb temperature of the atmosphere of the enclosure, and in which the proportions of cooled air and dehydrated air supplied to the enclosure are varied in response to changes in the moisture content of the atmosphere of the enclosure.

CARLYLE M. ASHLEY.